UNITED STATES PATENT OFFICE.

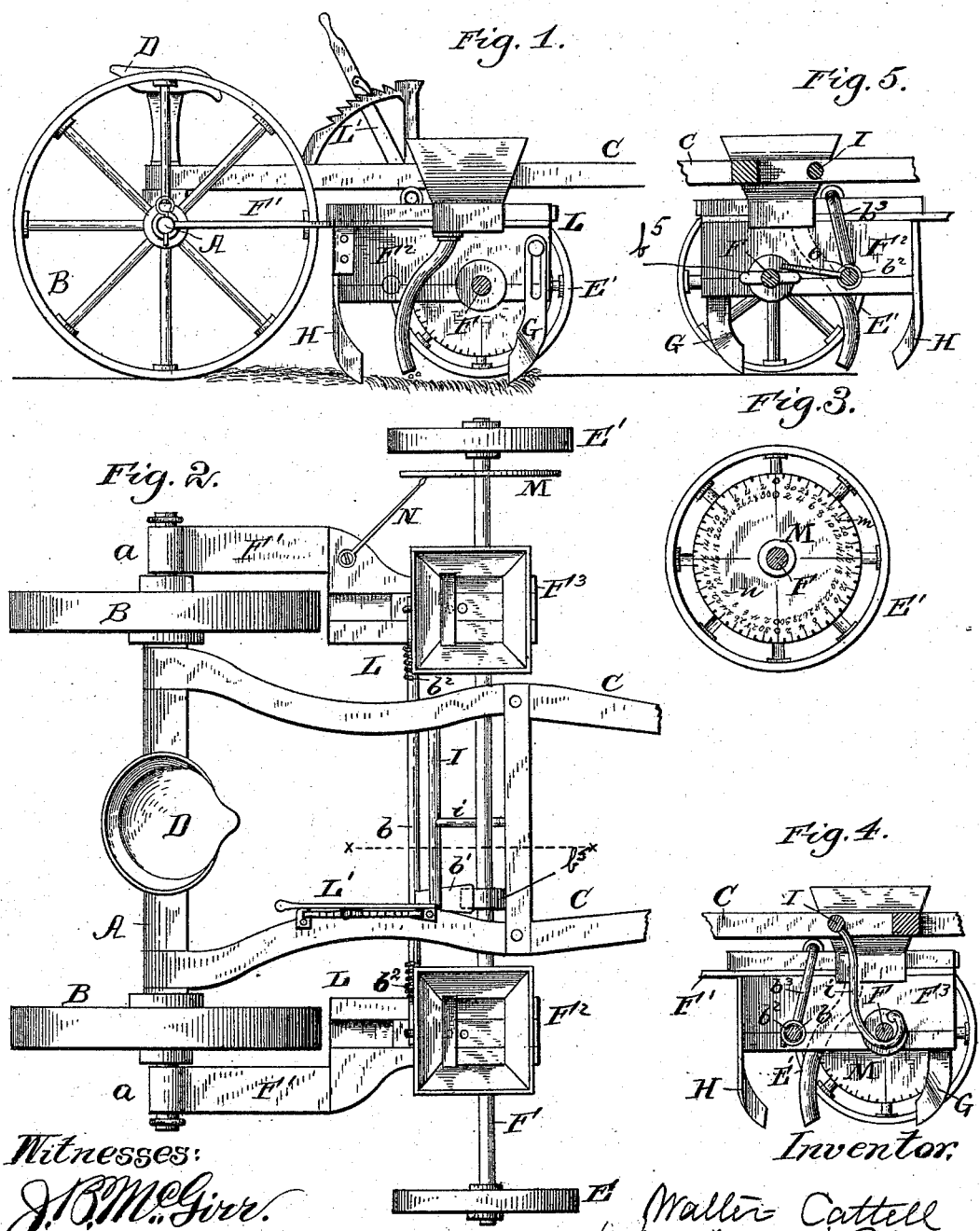

WALTER CATTELL, OF SMITHFIELD, PENNSYLVANIA.

CORN-PLANTER.

SPECIFICATION forming part of Letters Patent No. 470,661, dated March 15, 1892.

Application filed November 21, 1891. Serial No. 412,610. (No model.)

*To all whom it may concern:*

Be it known that I, WALTER CATTELL, a citizen of the United States, residing at Smithfield, in the county of Fayette and State of Pennsylvania, have invented certain new and useful Improvements in Corn-Planters, of which the following is a specification, reference being had therein to the accompanying drawings.

This invention belongs to the class of corn-planters and is designed to be used instead of a check-rower, the object of the invention being to provide a simple mechanism by means of which the kernels of corn may be planted in regular rows without the use of a cord or wire or other check-row appliances.

My invention consists of the new and useful features to be hereinafter fully described and pointed out.

In the drawings, Figure 1 is a side view of the planter. Fig. 2 is a top plan view. Fig. 3 is a view of the disk. Fig. 4 is a section on line $x\ x$, Fig. 2, looking in one direction; and Fig. 5 is a section on the same line looking in the other direction.

The main or wheel frame consists of the axle A, having the extensions $a\ a$ projecting beyond the wheels B B, which are mounted thereon, and the draft devices C, secured to the axle. The driver's seat D is supported on the axle in any of the well-known ways.

The supplementary frame carrying the seed-boxes is indicated as a whole by L. It consists of the two flat rearwardly-extending parts F', mounted pivotally on the extensions $a\ a$ of the main axle A and secured firmly in relation to each other by the cross rocking shaft $b$, which is used to actuate the dropping-slides. Journaled in the downwardly-projecting parts $F^2\ F^3$ of the frame-pieces F' is a shaft F, on which are keyed the power-wheels E E'.

I is a shaft having a hook $i$ or equivalent device which supports the shaft F and which when rocked by lever L' lifts the whole supplementary frame from the ground. The lever L' is locked in any position by a rack and ratchet, any of the well-known kinds being applicable for this purpose.

The seed-boxes are mounted on the supplementary frame and may be of any suitable kind.

As shown in the drawings, I use reciprocating slides actuated by the cross rock-shaft $b$. The way in which they are reciprocated is as follows: On the shaft F are two cams, which as the shaft revolves strike against an arm $b'$ on the cross-shaft $b$, lifting the arm and rocking the shaft backward. On the shaft $b$ are also levers $b^3$, which are connected to the feed-slides, and as the shaft $b$ is rocked these levers push back the slides. A spring $b^2$ is used to turn forward the shaft to its first position and move the slides forward, thus giving the slides a reciprocating motion.

In front of the droppers are furrow-openers G, while behind them are furrow-closers H. It will be noted that these devices are in line longitudinally with the main wheels B, by which arrangement of parts the wheels press the earth down on the grain after the furrow-closer has covered it over.

While I have shown and described the supplementary frame as being pivoted to the extensions $a\ a$ of the main axle, yet it is apparent that they can be as readily attached to the axle itself between the wheels, and I do not, therefore, limit myself to the first-mentioned construction.

I shall now describe the devices for planting the hills in regular rows.

On the shaft F, and for convenience near one of the wheels E E', is mounted a disk M, the circumference of which is here shown as being divided into sixty-four parts for illustration, although any number of parts may be used. The disk is divided in halves by a diameter, and it will be seen that there are two rows of fingers arranged concentrically around the circumference. Beginning at the diameter the numbers $m$ increase by a common number until 30 is reached, the next point being the opposite end of the diameter and being marked 0, the numbers increasing again in a similar manner the rest of the way around the disk. Inside of the outer row of figures is another row $n$, inversely arranged and also beginning with 0. This row is similar to that marked $m$, except that the figures increase in the opposite direction, as will be seen on inspecting the drawings. Thus it will be seen that each division-point has two numbers, as 8 in $m$ row and 24 in $n$ row. As aforesaid, the shaft F has two cams or projections, and the disk is therefore divided into two main points; but there may be any number of cams on the shaft, the disk being divided into as many parts. A pointer N is fixed on the supplementary frame, and the disk is so arranged on the axle that the two 0's in m row are opposite the pointer when the cams have rocked back shaft b, so that the reciprocating slides are at the point at which the grain is dropped.

The operation of the machine is as follows: Furrows are plowed or lines stretched at the edge of the field perpendicular to the direction in which the machine is to move. The planter is wheeled in position and the lever L' is moved forward, allowing wheels E E' to rest on the ground, and the horses are started. The wheels E E', rotating with axle F, cause the cams $b^5$ thereon to strike against the arm b' and rock-shaft b, pushing back the feed-slides and allowing the seed to drop through to the ground into the furrow opened by the opener G. The spring $b^2$ rocks shaft b forward, returning the feed-slides to their normal position. The furrow-closers H cover the seed and the wheels B press the earth firmly down upon it. When the machine has reached the cross-furrow at the other side of the field, the driver notes the number in the outer row of figures that is even with the pointer—say, for instance, six—and lifting the wheels E E' from the ground turns the machine around ready to start from the furrow and turns the wheels E until the corresponding number in the inner row of figures is even with the pointer. Then the machine is started across the field, the seed being dropped at points even with those in which the seed was planted in the first row. When the other side of the field is reached, the driver notes the figure in the inner row opposite the pointer and on reversing the machine turns the wheels E E' and the disk until the corresponding number on the m row is even with the pointer, and then proceeds as before described. I prefer to use two rows of figures on the disk, although I may use but one. For example, if it is found that when the furrow is reached the pointer indicates "8"—that is to say, the wheel has traversed one-eighth of its revolution after the seed was dropped—then the driver knows that when the machine is started again the ground-wheel must traverse one-eighth of its revolution, and therefore turns the wheels until the pointer is even with 30 plus two spaces to 0, (or thirty-two), 32 less 8, or 24. The principle is the same whether one or two rows of figures are used.

What I claim is—

1. The combination, with the main frame, comprising the axle, the wheels thereon, and the draft devices, of the supplementary frame mounted on the axle outside of the wheels, the seed-dropping devices thereon, the power-wheels mounted thereon, and means for elevating the frame, substantially as set forth.

2. The combination, with the main frame, comprising the axle, the wheels thereon, and the draft devices, of the supplementary frame pivoted on the axle outside of the wheels, the seed-dropping devices thereon and directly in front of the said wheels, the power-wheels mounted on the said supplementary frame, means connected to the power-wheels for actuating the seed-dropping devices, and means on the main frame for swinging said supplementary frame around said axle, substantially as set forth.

3. In a corn-planter, the combination, with the axle, the wheels thereon, and the draft devices, all comprising the main frame, of the supplementary frame having the rearwardly-extending parts mounted on the axle outside of the wheels, the seed-boxes mounted thereon, the slides in said boxes, the power-shaft mounted on said supplementary frame, the power-wheels on said shaft, and devices actuated by said shaft for reciprocating said slides, substantially as set forth.

4. The combination, with the main frame comprising the axle, the wheels thereon, and the draft devices, of the vertically-adjustable supplementary frame mounted on the axle outside of the wheels, means on the main frame for adjusting the supplementary frame, seed-boxes on the supplementary frame, reciprocating slides thereon, the power-shaft mounted on the last said frame, a rock-shaft mounted on said frame for reciprocating said slides, and devices on said power-shaft for actuating said rock-shaft, substantially as set forth.

5. The combination, with the main frame comprising the axle, the wheels, and the draft devices, of the vertically-adjustable supplementary frame pivoted on the said axle, the seed-dropping devices thereon, the power-shaft mounted thereon for operating the seed-dropping devices, and the lifting-levers connected to the pivoted frame and adapted to swing the seeding mechanism around the main axle, substantially as set forth.

6. In a corn-planter, the combination, with the main frame comprising the ground-wheels, the axle, and the draft devices, of the vertically-adjustable supplementary frame pivoted to the axle, the seed-dropping devices, the power-wheels, and the power-shaft for actuating the seed-dropping devices, all mounted on said pivoted frame, means, substantially as described, secured to the main frame for elevating the supplementary frame and the seeding mechanism around the main axle, and a lock whereby the frame is held stationarily elevated, substantially as set forth.

7. In a corn-planter, the combination, with the main frame comprising the main ground-wheels and the axle and the draft devices, of a supplemental frame pivoted to the axle and extending forward therefrom, the seed-boxes, the dropping devices, and the ground-wheels, all mounted on the said pivoted supplemental frame and together vibrating around the main axle, and a lever for elevating simultaneously the dropping devices and their ground-wheels, substantially as set forth.

8. In a corn-planter, the combination, with the main wheel-frame and the draft devices, of the vertically-adjustable supplementary frame, the power-shaft mounted thereon, the rock-shaft arranged parallel to the power-shaft, means on the power-shaft for actuating the rock-shaft, seed-boxes on the supplementary frame, slides therein, levers connecting the rock-shaft and the slides, whereby the slides are reciprocated, and the slide-actuating mechanism supported and operated on the supplemental frame independently of the main ground-wheels, substantially as set forth.

9. In a corn-planter, the combination, with the main wheel-frame, of the vertically-adjustable supplementary frame, the seed-dropping devices thereon, the power-shaft, the ground-wheels thereon, a disk on the power-shaft having its periphery uniformly subdivided, the subdivisions being indicated by two inversely-arranged series of numerals and being related to the dropping devices, substantially as set forth.

In testimony whereof I affix my signature in presence of two witnesses.

WALTER CATTELL.

Witnesses:
CHAS. S. GAUSE,
H. F. DETWILER.